(12) United States Patent
Mukherjee et al.

(10) Patent No.: US 10,009,622 B1
(45) Date of Patent: Jun. 26, 2018

(54) VIDEO CODING WITH DEGRADATION OF RESIDUALS

(71) Applicant: Google Inc., Mountain View, CA (US)

(72) Inventors: Debargha Mukherjee, Cupertino, CA (US); Shunyao Li, Goleta, CA (US); Peyman Milanfar, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 143 days.

(21) Appl. No.: 14/969,675

(22) Filed: Dec. 15, 2015

(51) Int. Cl.
| | |
|---|---|
| *H04N 7/12* | (2006.01) |
| *H04N 19/52* | (2014.01) |
| *H04N 19/124* | (2014.01) |
| *H04N 19/82* | (2014.01) |
| *H04N 19/44* | (2014.01) |
| *H04N 19/59* | (2014.01) |
| *H04N 19/61* | (2014.01) |
| *H04N 19/91* | (2014.01) |
| *H04N 19/86* | (2014.01) |
| *H04N 19/107* | (2014.01) |
| *H04N 19/176* | (2014.01) |
| *H04N 19/182* | (2014.01) |

(52) U.S. Cl.
CPC .......... *H04N 19/52* (2014.11); *H04N 19/107* (2014.11); *H04N 19/124* (2014.11); *H04N 19/176* (2014.11); *H04N 19/182* (2014.11); *H04N 19/44* (2014.11); *H04N 19/59* (2014.11); *H04N 19/61* (2014.11); *H04N 19/82* (2014.11); *H04N 19/86* (2014.11); *H04N 19/91* (2014.11)

(58) Field of Classification Search
CPC ....................................................... H04N 19/52
USPC ..................................................... 375/240.13
See application file for complete search history.

(56) References Cited

U.S. PATENT DOCUMENTS

| | | | |
|---|---|---|---|
| 5,511,137 | A | 4/1996 | Okada |
| 6,252,576 | B1 | 6/2001 | Nottingham |
| 6,724,847 | B1 | 4/2004 | Kallman et al. |
| 7,155,213 | B1 | 12/2006 | Almeda et al. |
| 7,224,733 | B1 | 5/2007 | Benzler et al. |

(Continued)

FOREIGN PATENT DOCUMENTS

| | | |
|---|---|---|
| EP | 1359763 A2 | 11/2003 |
| EP | 1507415 A2 | 2/2005 |

(Continued)

OTHER PUBLICATIONS

Alshina E. et al.:"CE3: Experimental results of DCTIF by Samsung", 4,JCT-VC Meeting; 95, MPEG Meeting; Daegu; (Joint Collaborative Team on Video Coding of ISO/IEC JTC1/SC29/WG1 and ITU-T SG.16),No. JCTVC-D344, Jan. 15, 2011, Sections 1,2 and 6.

(Continued)

*Primary Examiner* — Richard Torrente
(74) *Attorney, Agent, or Firm* — Young Basile Hanlon & MacFarlane, P.C.

(57) ABSTRACT

A method for encoding a video signal using a computing device, the video signal having a plurality of frames, each frame having a plurality of blocks, and each block having a plurality of pixels. The method includes generating a residual block from an original block of a current frame and a prediction block, degrading the residual block to decrease a bit-cost for encoding the residual block, and encoding the residual block into an encoded residual block.

16 Claims, 11 Drawing Sheets

(56) References Cited

U.S. PATENT DOCUMENTS

| | | | |
|---|---|---|---|
| 7,349,473 | B2 | 3/2008 | Hallapuro et al. |
| 7,505,636 | B2 | 3/2009 | MacInnis et al. |
| 7,555,043 | B2 | 6/2009 | Sato et al. |
| 7,660,471 | B2 | 2/2010 | Bjontegaard |
| 7,778,494 | B2 | 8/2010 | Shastry et al. |
| 7,958,177 | B2 | 6/2011 | Zhu |
| 7,965,177 | B2 | 6/2011 | Kobayashi et al. |
| 8,208,564 | B2 | 6/2012 | Bossen et al. |
| 8,437,581 | B2 | 5/2013 | Lou et al. |
| 8,451,889 | B2 | 5/2013 | Lee et al. |
| 8,565,558 | B2 | 10/2013 | Lou et al. |
| 8,576,906 | B2 | 11/2013 | Andersson et al. |
| 8,792,559 | B2 | 7/2014 | Robertson et al. |
| 8,811,484 | B2 | 8/2014 | Motta et al. |
| 2003/0112864 | A1 | 6/2003 | Karczewicz et al. |
| 2003/0156646 | A1 | 8/2003 | Hsu et al. |
| 2003/0194007 | A1 | 10/2003 | Chen et al. |
| 2003/0194009 | A1 | 10/2003 | Srinivasan |
| 2004/0062307 | A1 | 4/2004 | Hallapuro et al. |
| 2004/0076333 | A1 | 4/2004 | Zhang et al. |
| 2004/0213470 | A1 | 10/2004 | Sato et al. |
| 2005/0010561 | A1 | 1/2005 | de Bois et al. |
| 2005/0105611 | A1 | 5/2005 | Bjontegaard |
| 2006/0133506 | A1 | 6/2006 | Dang |
| 2006/0268991 | A1 | 11/2006 | Segall et al. |
| 2006/0294171 | A1 | 12/2006 | Bossen et al. |
| 2007/0133687 | A1 | 6/2007 | Wittmann et al. |
| 2008/0075165 | A1 | 3/2008 | Ugur et al. |
| 2008/0089418 | A1 | 4/2008 | Kim et al. |
| 2008/0166068 | A1 | 7/2008 | Fuchigami |
| 2008/0205793 | A1 | 8/2008 | Nilsson et al. |
| 2009/0016634 | A1 | 1/2009 | Cox et al. |
| 2009/0257499 | A1 | 10/2009 | Karczewicz et al. |
| 2009/0257503 | A1 | 10/2009 | Ye et al. |
| 2010/0002770 | A1 | 1/2010 | Motta et al. |
| 2010/0111182 | A1 | 5/2010 | Karczewicz et al. |
| 2010/0135398 | A1 | 6/2010 | Wittmann et al. |
| 2010/0246998 | A1 | 9/2010 | He et al. |
| 2011/0116546 | A1 | 5/2011 | Guo et al. |
| 2011/0200108 | A1 | 8/2011 | Joshi et al. |
| 2011/0243471 | A1 | 10/2011 | Alshina et al. |
| 2011/0249737 | A1 | 10/2011 | Joshi et al. |
| 2012/0008686 | A1 | 1/2012 | Haskell |
| 2012/0134425 | A1 | 5/2012 | Kossentini et al. |
| 2012/0183068 | A1 | 7/2012 | Lou et al. |
| 2012/0224639 | A1 | 9/2012 | Lou et al. |
| 2012/0230407 | A1 | 9/2012 | Minoo et al. |
| 2012/0230413 | A1 | 9/2012 | Lou et al. |
| 2012/0328020 | A1 | 12/2012 | Lou et al. |
| 2013/0003841 | A1 | 1/2013 | Minoo et al. |
| 2013/0051463 | A1 | 2/2013 | Minoo et al. |
| 2013/0114677 | A1* | 5/2013 | Baylon .............. H04N 19/176 375/240.02 |
| 2013/0129240 | A1* | 5/2013 | Shima .................. G06T 9/004 382/233 |
| 2013/0182780 | A1 | 7/2013 | Alshin et al. |
| 2014/0050264 | A1 | 2/2014 | He et al. |
| 2014/0078394 | A1 | 3/2014 | Lou et al. |
| 2014/0233634 | A1 | 8/2014 | Alshina et al. |
| 2014/0307774 | A1 | 10/2014 | Minoo et al. |
| 2015/0312592 | A1* | 10/2015 | Zheng ............... H04N 19/597 375/240.02 |

FOREIGN PATENT DOCUMENTS

| | | | |
|---|---|---|---|
| EP | 1973350 | A1 | 9/2008 |
| WO | 2004006558 | A2 | 1/2004 |
| WO | 2006006609 | A1 | 1/2006 |
| WO | 2007011189 | A1 | 1/2007 |
| WO | 2010039288 | A1 | 4/2010 |
| WO | 2011046587 | A1 | 4/2011 |

OTHER PUBLICATIONS

Bankoski et al. "VP8 Data Format and Decoding Guide; draft-bankoski-vp8-bitstream-02" Network Working Group. Internet-Draft, May 18, 2011, 288 pp.

H.26L Test Model Long Term No. 3 (TML-3) Draft 0, ITU-T Telecommunication Standardization Sector of ITU; May 16, 2000, pp. 1-24.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Ji et al., "Block-Wise Adaptive Motion Accuracy Based B-Picture Coding With Low-Complexity Motion Compensation," IEEE Transactions on Circuits and Systems for Video Technology; vol. 17, No. 8; Aug. 1, 2007; pp. 1085-1090.

Lou J. et al., "Motorola Mobility's adaptive interpolation filter" JCTCV-E359, MPEG Meeting: Geneva, Mar. 16, 2011.

Lou_J et al.: "New DCT-based interpolation filters", 95. MPEG Meeting; Daegu; (Motion Picture Expert Group or ISO/IEC JTC1/SC29/WG11), No. m19007, JCTVC-D246 Jan. 20, 2011, section 3.

Overview; VP7 Data Format and Decoder. Version 1.5. On2 Technologies, Inc. Dated Mar. 28, 2005.

Sato K. et al.; "Adaptive MC interpolation for memory access reduction in JVT video coding," Seventh International Symposium on Signal Processing and its Applications; vol. 1; Jul. 1, 2003; pp. 77-80.

Sato K., et al., "Adaptive MC Interpolation Filter for Complexity Reduction" No. JVT-C052, May 6, 2002, pp. 1-6.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: December 1, 2010.

Wedi T et al.: "Motion-and aliasing—compensated prediction for hybrid video coding", IEE Transactions on Circuits and Systems for video Technology, IEE Service Center, Piscataway, NJ, US,vol. 13, No. 7, Jul. 1, 2003, pp. 577-586.

Wedi: "New Results on Adaptive Interpolation Filter", 3, JVT-VC Meeting; 60. MPEG Meeting; Fairfax,US; (Joint Collaborative

(56) References Cited

OTHER PUBLICATIONS

Team of ISO/IEC/JTC1/SC29/WG11 and ITU-T SG.16), No. JVT-0059, May 10, 2002, Sections 1 and 2.
Wiegand et al, "Overview of the H 264/AVC Video Coding Standard," IEEE Transactions on Circuits and Systems for Video Technology, vol. 13, No. 7, pp. 568, 569, Jul. 1, 2003.
Xiong L.: "Spatial upsampling filter," 17, JVT Meeting; 74. Mpeg Meeting; 14*10-2005; Nice, FR (Joint Video Team of ISO/IEC JTC1/SC29/WG11 and ITU-T SG16_, No. JVT-Q051, Oct. 11, 2005, all pages.
Yoshino T.,et al.; "Enhanced switching of interpolation filter for HEVC," Motion Picture Expert Group or ISO/IEC; Oct. 28, 2010.
Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bross, Benjamin et al.: "High Efficiency Video Coding (HEVC) text specification draft 8,"Joint Collaborative Team on Video Coding(JCT-VC) of ISO/IEC JTC1/SC29/WG11 and ITU-T SG16 WP3, 10th Meeting : Stockholm, SE Jul. 20, 2012 , JCTVC-J1003_d8.
Lou J et al.: "CE3: Slice-type based adaptive interpolation filter tests by Motorola Mobility", 6. JCT-VC Meeting; 97. MPEG Meeting; Torino; (Joint Collaborative Team on Video Coding of ISO/IEC JTC1/SC29/WG11 and ITU-T SG.16), No. JCTVC-F576, Jul. 7, 2011, Section 2.2.
Mozilla, "Introduction to Video Coding Part 1: Transform Coding", Video Compression Overview, Mar. 2012, 171 pp.

\* cited by examiner

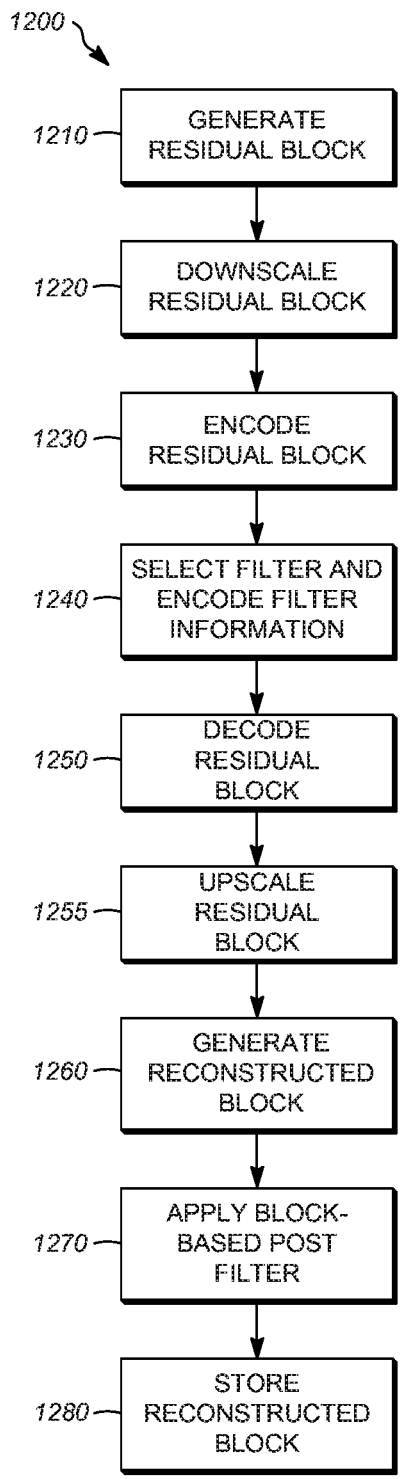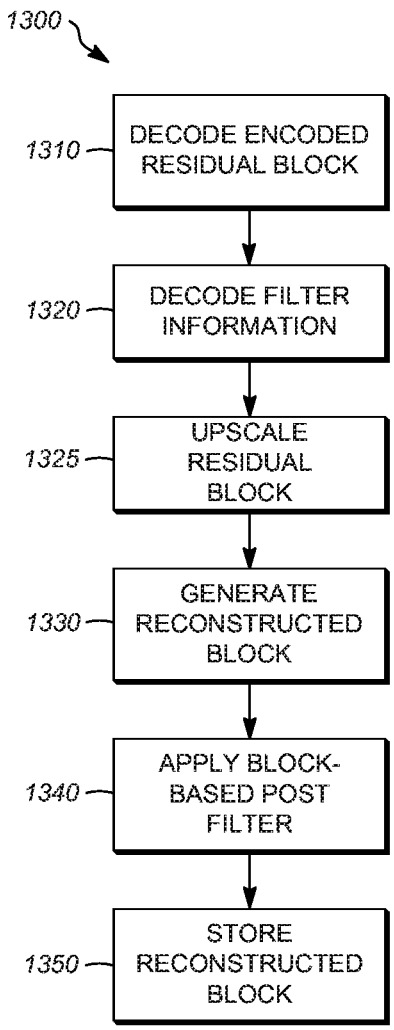
FIG. 12
FIG. 13

VIDEO CODING WITH DEGRADATION OF RESIDUALS

TECHNICAL FIELD

This disclosure relates to encoding and decoding visual data, such as video stream data, for transmission or storage and subsequent display.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. In addition, video data can be transmitted or stored at varying spatial resolutions in order to save transmission or storage bandwidth.

Modern video codecs use block-based coding. Each frame is divided into different sizes of blocks. Prediction methods exploit spatial and temporal similarities between blocks to achieve high compression ratios. These prediction methods include inter-prediction methods that exploit temporal redundancies in the data by utilizing information from other frames to generate a prediction, and intra-prediction methods that exploit spatial redundancies to generate a prediction using information only from the current frame. To encode a block in a video frame, a prediction for a current block is created by identifying a best matching block from a reference frame and calculating a prediction residual by subtracting the reference block from the current block. The residual is then encoded and written to the bitstream. The decoder decodes the bitstream and gets the residual, adds it to the prediction to generate a reconstruction of the block. The reconstruction is used for further blocks in current or future frames as reference, which forms a closed-loop scheme.

For example, in certain video compression schemes, a video frame is first divided into basic encoding units called super blocks. The super blocks are further divided into rectangular or square partitions. For 64×64 super blocks, the partition sizes can range from 4×4 to 64×64. Prediction is then performed at the partition level. For each partition, the prediction residuals are generated, are transformed, and then the transform coefficients are quantized and coded before they are written to the bitstream.

SUMMARY

One aspect of the disclosed embodiments is a method for encoding a video signal using a computing device, the video signal having a plurality of frames, each frame having a plurality of blocks, and each block having a plurality of pixels. The method includes generating a residual block from an original block of a current frame and a prediction block, degrading the residual block to decrease a bit-cost for encoding the residual block, and encoding the residual block into an encoded residual block.

Another aspect of the disclosed embodiments is a method for decoding a video bitstream using a computing device, the video bitstream having a plurality of frames, each frame having a plurality of blocks, and each block having a plurality of pixels. The method includes decoding an encoded residual block from the video bitstream into a decoded residual block, generating a reconstructed block from a prediction block and the decoded residual block, and applying a block-based post filter to the reconstructed block.

Another aspect of the disclosed embodiments is an apparatus for encoding a video signal using a computing device, the video signal having a plurality of frames, each frame having a plurality of blocks, and each block having a plurality of pixels. The apparatus includes a memory and a processor configured to execute instructions stored in the memory to generate a residual block from an original block of a current frame and a prediction block, degrade the residual block to decrease a bit-cost for encoding the residual block, and encode the residual block into an encoded residual block.

Another aspect of the disclosed embodiments is An apparatus for decoding a video bitstream using a computing device, the video bitstream having a plurality of frames, each frame having a plurality of blocks, and each block having a plurality of pixels. The apparatus includes a memory and a processor configured to execute instructions stored in the memory to decode an encoded residual block from the video bitstream into a decoded residual block, generate a reconstructed block from a prediction block and the decoded residual block, and apply a block-based post filter to the reconstructed block.

BRIEF DESCRIPTION OF THE DRAWINGS

The description herein makes reference to the accompanying drawings wherein like reference numerals refer to like parts throughout the several views, and wherein:

FIG. 12 is a flowchart showing an encoding process according to the second example; and FIG. 13 is a flowchart showing a decoding process according to the second example.

DETAILED DESCRIPTION

This disclosure is directed to video compression and decompression techniques in which the residual blocks are degraded during encoding, and block-based post filtering is utilized during decoding to recover high frequency information that is lost as a result of the degradation. For example, a linear filter or a non-linear filter can be applied during final reconstruction. The newly filtered block would then be used as the final reconstruction for future reference in the coding loop.

In some implementations, the post filter is applied directly to the reconstruction. In other implementations, the post filter is not utilized. Thus, information can be included in the bitstream that indicates whether or not the filter is to be used. In some implementations, the encoder may choose to use or not use the post filter based on rate-distortion cost. In addition, the encoder may encode information into the bitstream regarding the filter to be used. In some implementations, this information identifies a specific filter index from a family of post filters. In other implementations, this information includes parameters for a parameterized family of filters. In some implementations, this information includes the actual filter taps at an appropriate precision.

Figure 1:
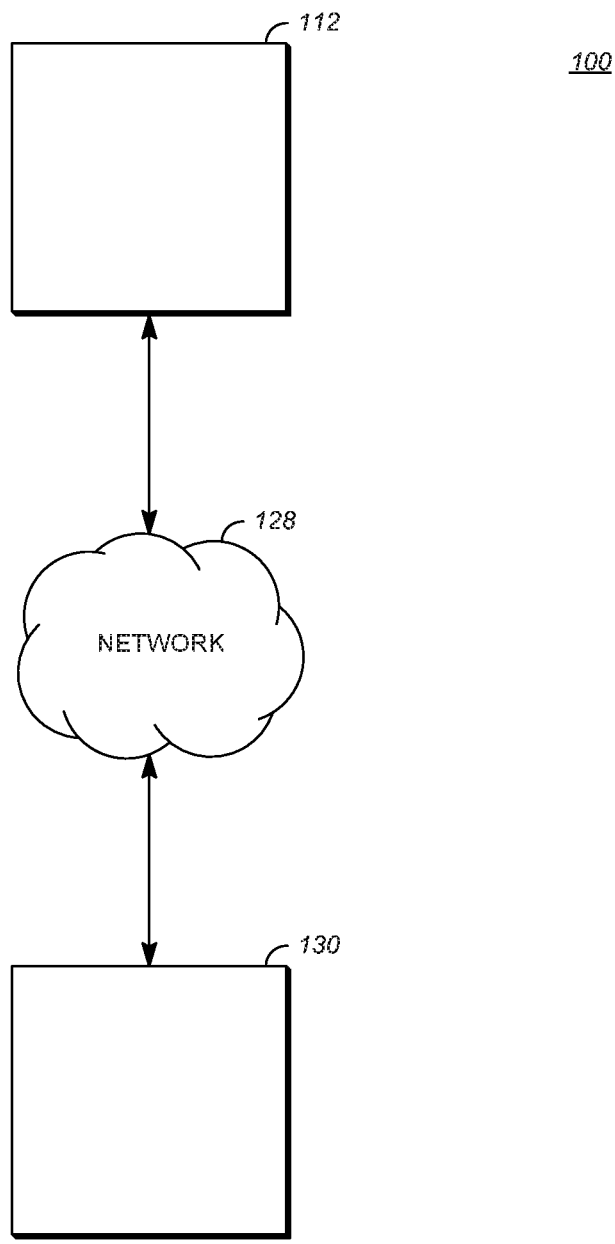
FIG. 1 is a schematic of a video encoding and decoding system.

FIG. 1 is a schematic of a video encoding and decoding system 100 in which the systems and methods described herein can be implemented. An exemplary transmitting station 112 can be, for example, a computer having an internal configuration of hardware such as that described in FIG. 2. However, other suitable implementations of the transmitting station 112 are possible. For example, the processing of transmitting station 112 can be distributed among multiple devices.

A network 128 can connect the transmitting station 112 and a receiving station 130 for encoding and decoding of a video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
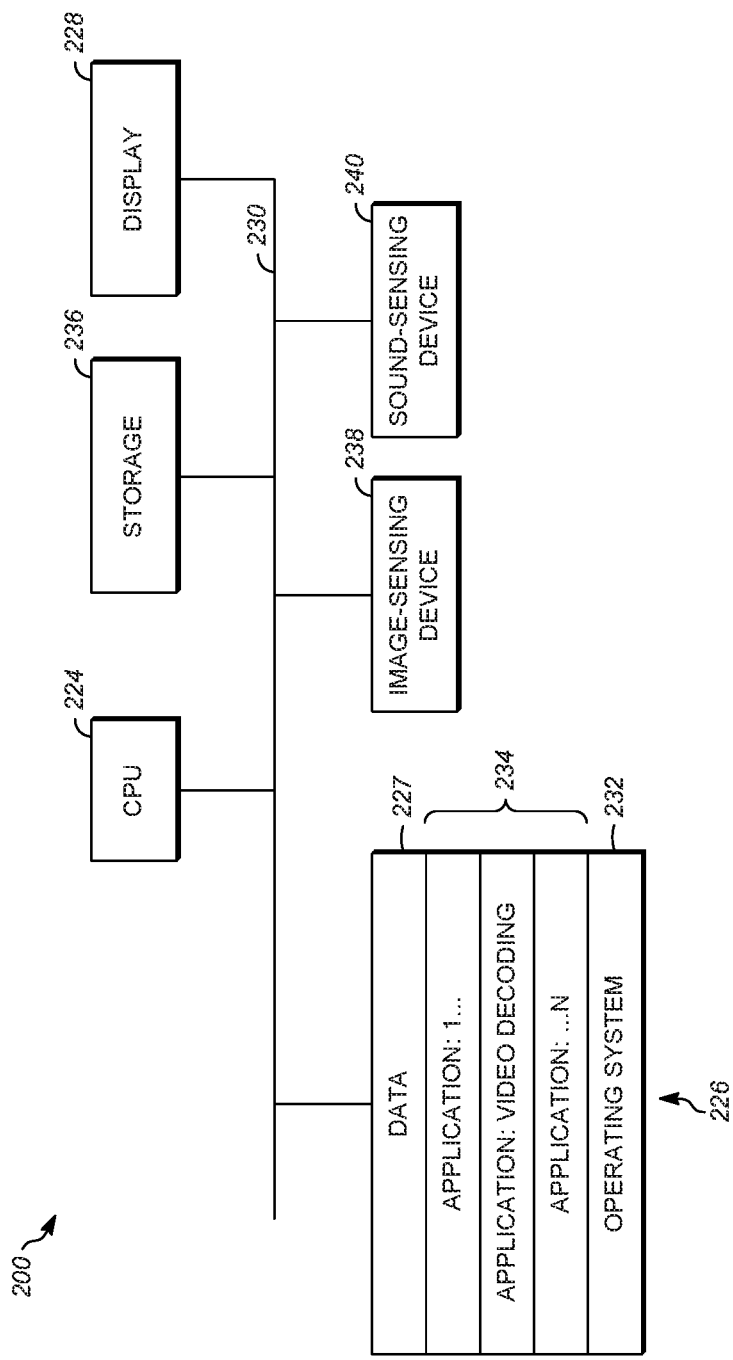
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, the receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

As will be explained further herein, the transmitting station 112 and the receiving station 130 are examples of devices that can be included in the video encoding and decoding system 100. Additional devices can be included, such as a server that relays transmissions from the transmitting station 112 to the receiving station 130.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as the memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. As shown, for example, application programs 234 can include applications 1 through N, which further include an that performs a method described here. Computing device 200 can also include a secondary storage 236 that can be, for example, a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
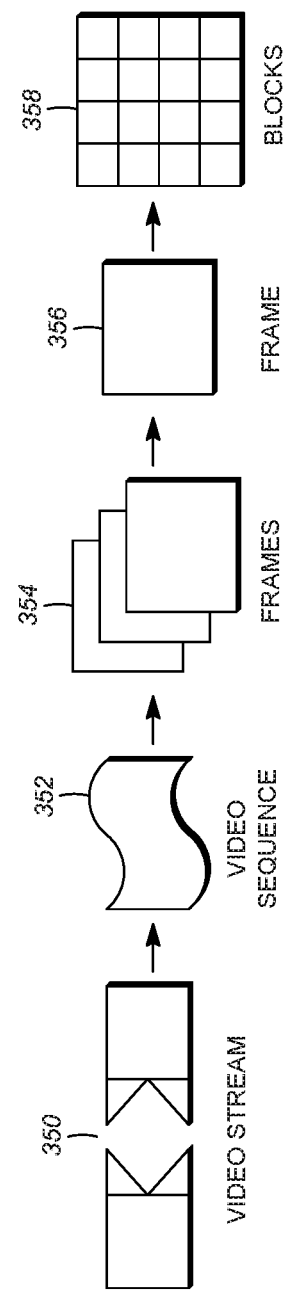
FIG. 3 is a diagram of a typical video stream to be encoded and subsequently decoded.

FIG. 3 is a diagram of an example of a video 350 to be encoded and subsequently decoded. Video 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, single frame 356 can be divided into a series of blocks 358, which can contain data corresponding to, for example, 16×16 pixels in frame 356. The blocks can also be arranged in planes of data. For example, a corresponding block in each plane can respectively contain luminance and chrominance data for the pixels of the block. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 4:
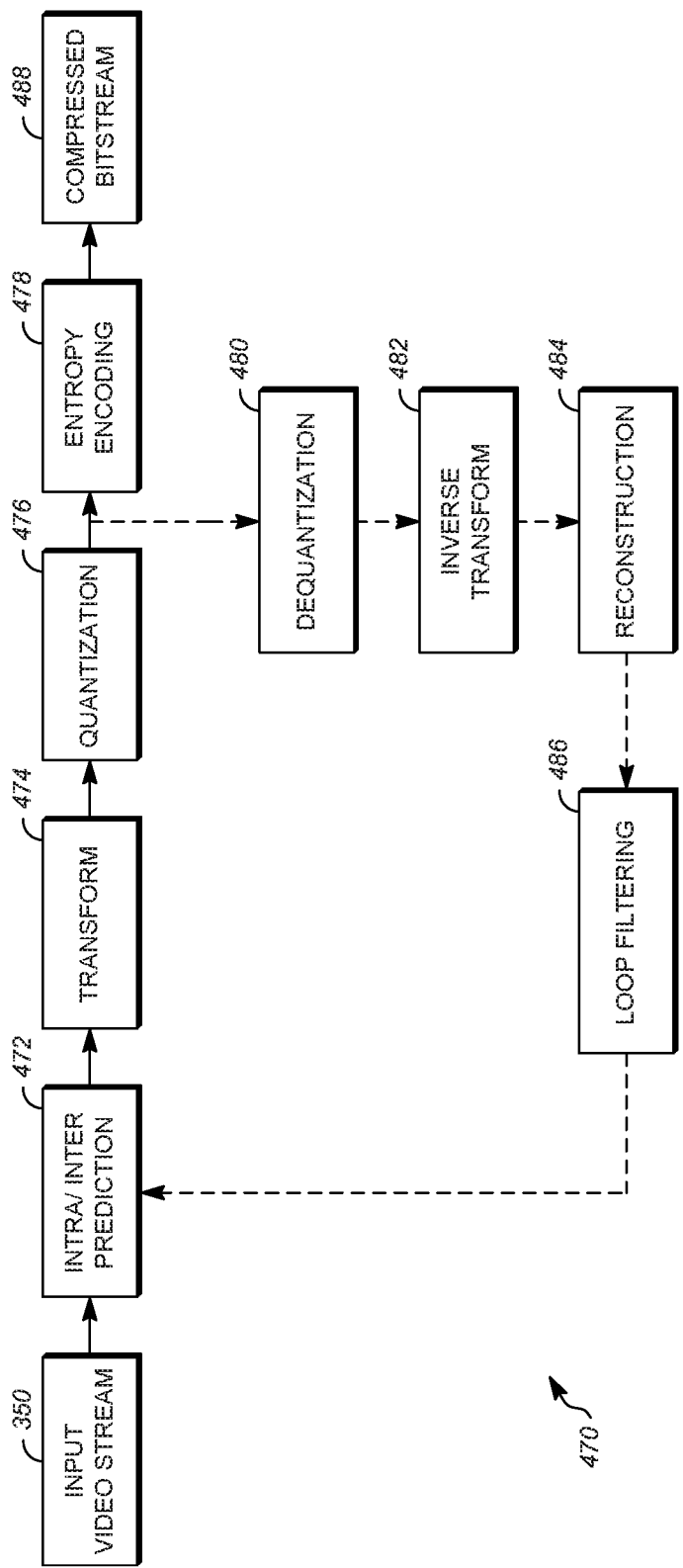
FIG. 4 is a block diagram of a video compression system in accordance with an aspect of this disclosure.

FIG. 4 is a block diagram of an encoder 470 in accordance with an aspect of this disclosure. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included, for example, in transmitting station 112. Encoder 470 has the following stages to perform the various functions in a forward path (shown by the solid connection lines) to produce an encoded or compressed bitstream 488 using input video 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in a reconstruction path: a dequantization stage 480, an inverse transform stage 482, a reconstruction stage 484, and a loop filtering stage 486. Other structural variations of encoder 470 can be used to encode video 350.

When video 350 is presented for encoding, each frame 356 within the video 350 can be processed in units of blocks 358. At the intra/inter prediction stage 472, each block can be encoded using intra-frame prediction (prediction using blocks within a single frame) or inter-frame prediction (prediction using blocks from a different frame). In any case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to compressed bitstream 488. Compressed bitstream 488 can be formatted using various techniques, such as variable length coding (VLC) or arithmetic coding. Compressed bitstream 488 can also be referred to as an encoded video stream and the terms are used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
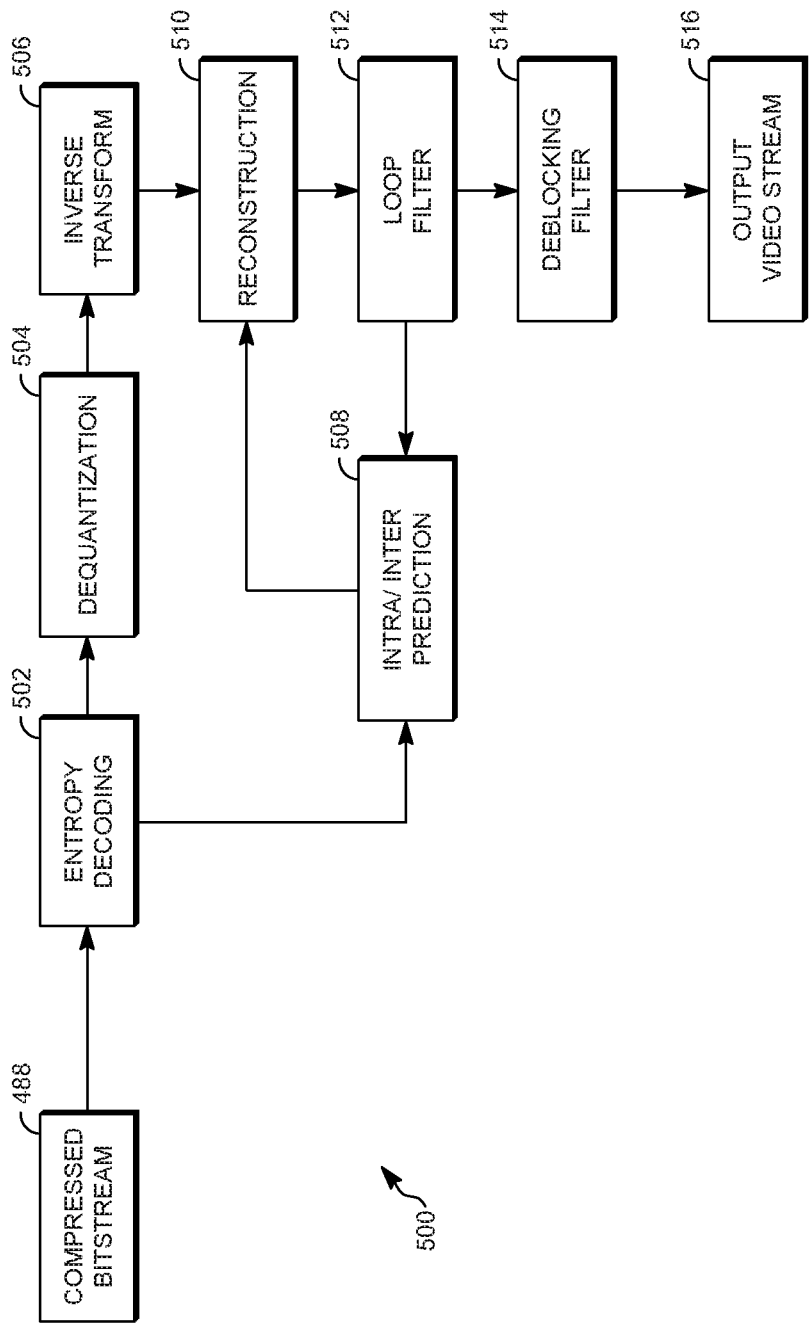
FIG. 5 is a block diagram of a video decompression system in accordance with another aspect of this disclosure.

FIG. 5 is a block diagram of a decoder 500 in accordance with an implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included, for example, in transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a filtering stage 512, which can include loop filtering and/or deblocking and a frame buffering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488 such as modes and motion vectors, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Filtering stage 512 can be applied to the reconstructed block to reduce blocking artifacts. Information can then be held in a frame buffer at frame buffering stage 514 for subsequent use in decoding or output. A post-processing stage can be applied to the reconstructed block to further refine the image. The result of the process performed by the decoder 500 is output as output video stream 516. Output video stream 516 can also be referred to as a decoded video stream and the terms are used interchangeably herein.

Other variations of decoder 500 can be used to decode compressed bitstream 488. For example, decoder 500 can produce output video stream 516 without post-processing.

Figure 6:
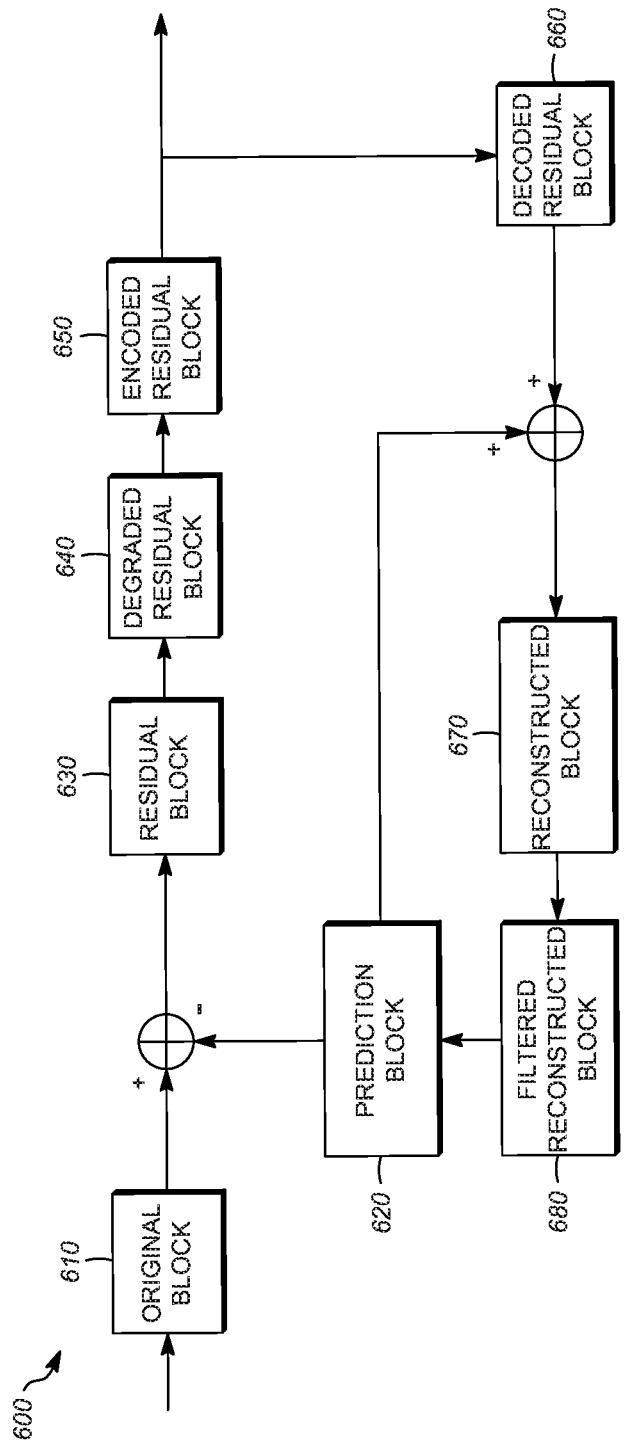
FIG. 6 is a block diagram showing encoding applied to an original block of a video signal according to a first example.

FIG. 6 is a block diagram showing video encoding 600 that incorporates degradation of residual blocks and block-based post filtering according to a first example, applied to an original block 610 from a video signal having a plurality of frames, each frame having a plurality of blocks, and each block having a plurality of pixels. Video encoding 600 can be implemented, for example, in the encoder 470, and the description of the encoder 470 is applicable except as described herein.

A prediction block 620 is identified for use in generating a residual block 630. The prediction block 620 can be a block from a different frame than the current frame if an inter-prediction mode is used, or can be a block from the current frame if an intra-prediction mode is used. The prediction block 620 is selected in a conventional manner according to the prediction mode used, such that the prediction block 620 has a high degree of correspondence to the original block 610. In order to generate the residual block 630, the prediction block 620 is subtracted from the original block 610, and the remaining information is utilized as the residual block 630.

In order to reduce the bit cost for encoding the residual block 630, the residual block 630 is intentionally degraded to generate a degraded residual block 640. Degrading the residual block 630 can be performed in any manner that reduces the quality and the bit cost required to transmit the degraded residual block 640. One example of a degradation that can be applied to the residual block 630 is modification of the step size used for quantization of the residual block 630. For example, quantization can be performed during encoding of the residual in the manner described with regard to the quantization stage 476 of the encoder 470, but using a larger quantization step size than otherwise would be used. This results in a decrease in the bit cost to encode the residual. Thus, in an implementation where a nominal quantization step size is utilized for the current frame, degrading the residual can include selecting a larger quantization step size for the current block, as compared to the normal quantization step size. As another example, the larger quantization step size can be selected by setting the quantization step size can be larger than that used for other coding modes that are applied to the current frame.

The degraded residual block 640 is encoded to define an encoded residual block 650. Encoding can be performed as described with respect to the video encoder 470, including transform stage 474, quantization stage 476, and entropy encoding in stage 478. The encoded residual block 650 can be stored or transmitted. In some implementations, filter information is stored or transmitted along with the encoded residual block 160. The filter information can indicate whether a filter is to be applied during decoding, can include information such as an identifier that corresponds to a predefined filter to be used for filtering, and/or can include a plurality of filter parameters that can be utilized during decoding.

Subsequent to generation of the encoded residual block 650, the information from the encoded residual block 650 is recovered using a process analogous to that which will be applied at the decoder side in order to generate a prediction block that can be used for encoding of subsequent blocks in the current frame or a different frame. Thus, the encoded residual block 650 is decoded to generate a decoded residual block 660, such as in the manner described with respect to empty decoding stage 502, de-quantization stage 504, and inverse transform stage 506 of the decoder 500. The decoded residual block 660 is then added to the prediction block 620 that was previously utilized to generate the residual block 630 from the original block 610. The result of adding the decoded residual block 660 to the prediction block 620 is a reconstructed block 670.

In order to recover some of the high frequency information that was lost during degradation of the residual block 630 to define the degraded residual block 640, a block-based post-filter is applied to the reconstructed block 670. In some implementations, the filter is a block-based loop filter. The block-based loop filter that is utilized for filtering the reconstructed block 670 can be designed in various ways. In one implementation, the block-based loop filter is a Weiner filter, which minimizes the mean square area between the reconstructed block 670 and the original block 610. For a given filter window size, the filter can be designed as a two-dimensional Weiner filter using linear estimation theory. The two-dimensional Weiner filter is then decomposed into two one-dimensional filters. The two-dimensional filter can be decomposed into two one-dimensional filters using decomposition techniques such as singular value decomposition and iterative optimization.

The block-based loop filters can be generated in advance of encoding or can be generated during the encoding process. Predefined filters can be defined in advance of encoding by training a plurality of filters using a variety of sample video input filters. The trained filters are then clustered, and the filter at the center of each cluster can be utilized to form a filter family. The filter family is then made available at both the end coder and the decoder. During encoding, a particular family can be selected. As one example, the filter can be selected by comparing the rate distortion performance for a plurality of the filters from the filter family as applied to at least a portion of the video signals being encoded. The selected filter can then be applied to other portions of the video signal. Selection of the filter can be made at any level of granularity. Thus, the same filter could be selected for a series of frames, a single frame, a macroblock, or the filter could be selected on a block-by-block basis. In another implementation, the filter to be used for filtering the reconstructed block 670 is designed during encoding, with the result of filtered selection being a plurality of filter parameters that can be transmitted to the decoded for use in decoding the video bit stream.

As previously indicated, information identifying the filter selected for filtering the reconstructed block 670 can be stored in association with the video bit stream. In one implementation, information identifying the filter to be utilized can be encoded within the block header for each block. In implementations where a predefined filter is used, information identifying the predefined filter is transmitted or stored with the video bit stream. In implementations where a filter is designed during encoding, the parameters describing the filter can be transmitted or stored with the video bit stream.

The result of filtering the reconstructed block 670 utilizing the block-based post filter is the filtered reconstructed block 680. The filtered reconstructed block can be stored at the encoder for use in subsequent prediction operations.

Figure 7:
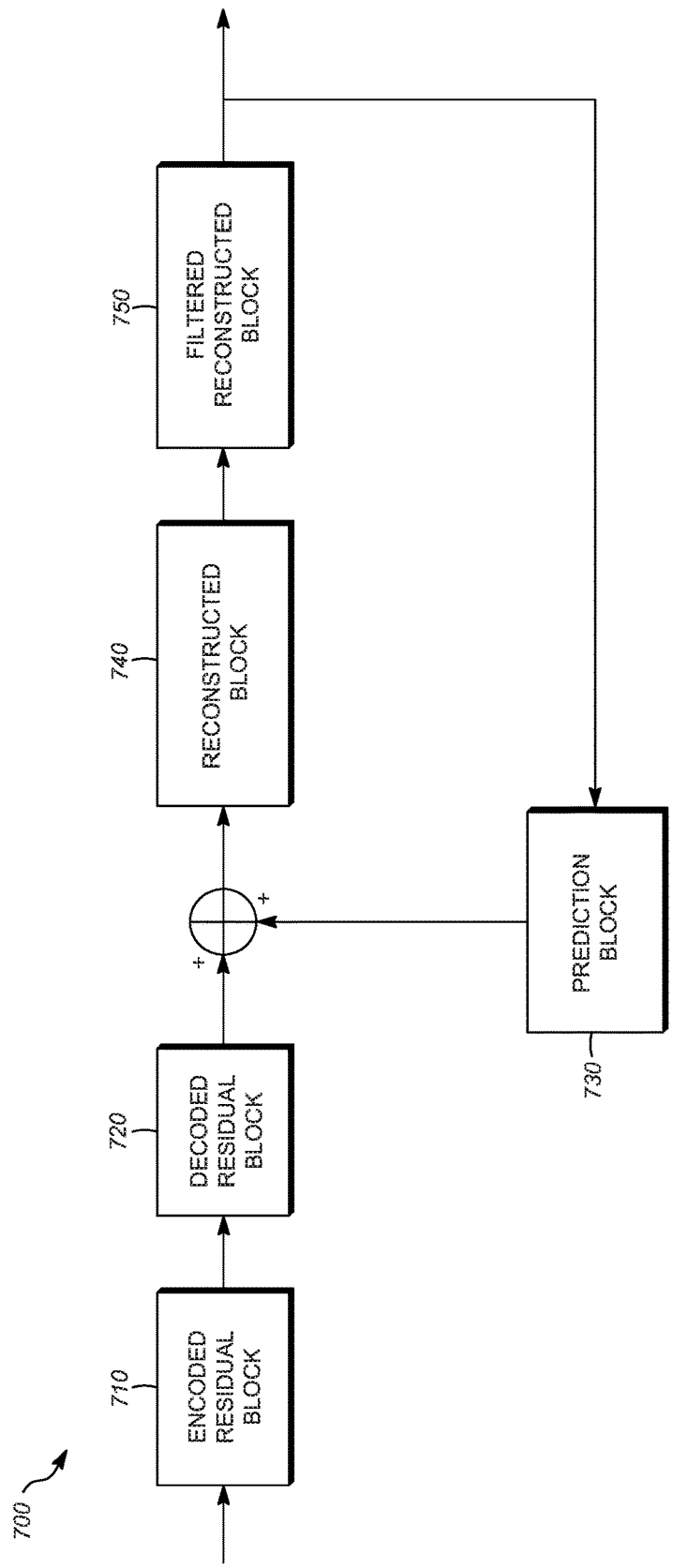
FIG. 7 is a block diagram showing decoding applied to an encoded block of a video bitstream according to the first example.

FIG. 7 is a block diagram showing video decoding 700 that incorporates recovery of information lost as a result of intentional degradation of residual blocks by using block-based post filtering. Video decoding 700 is applied to an encoded residual block 710 from a video bit stream having a plurality of frames, each frame having a plurality of blocks, and each block having a plurality of pixels. The encoded residual block 710 can be formed in the manner described with respect to video encoding 600.

The encoded residual block 710 is decoded into a decoded residual block 720. Decoding of the encoded residual block 720. Decoding of the encoded residual block 710 can be performed in the manner described with respect to the entropy decoding stage 502, the dequantization stage 504, and the inverse transform stage 506 of the decoder 500. Decoding the encoded residual block 710 can include decoding filter information from the video bitstream regarding the block-based post filter for the decoded residual block 720.

The decoded residual block 720 is combined with a prediction block 730 by adding the decoded residual block 720 to the prediction block 730. The result is a reconstructed block 740. The reconstructed block 740 is of reduced quality relative to the original block 610 owing to degradation of a residual block 630 when generating the degraded residual block 640 during video encoding 600. In order to restore some of the high frequency information that was lost during degradation, a block-based filter is applied to the reconstructed block 740, which results in a filtered reconstructed block 750. The filter applied to generate the filtered reconstructed block 750 can be identified from information in the video bit stream, such as filter information regarding the block-based post filter to be utilized in filtering the reconstructed block 740. As previously discussed, the filter information can be received from the video bit stream, such as by decoding the filter information from the header of the encoded residual block 710. The filter information can include, for example, an identifier that corresponds to a predefined filter or a plurality of filter parameters that define the filter.

The filtered reconstructed block 750 can be output as a video signal. For example, the filtered reconstructed block 750 could be output for display. The filtered reconstructed block is also stored for use in decoding of other blocks by storing the filtered reconstructed block 750 as the prediction block 730.

Figure 8:
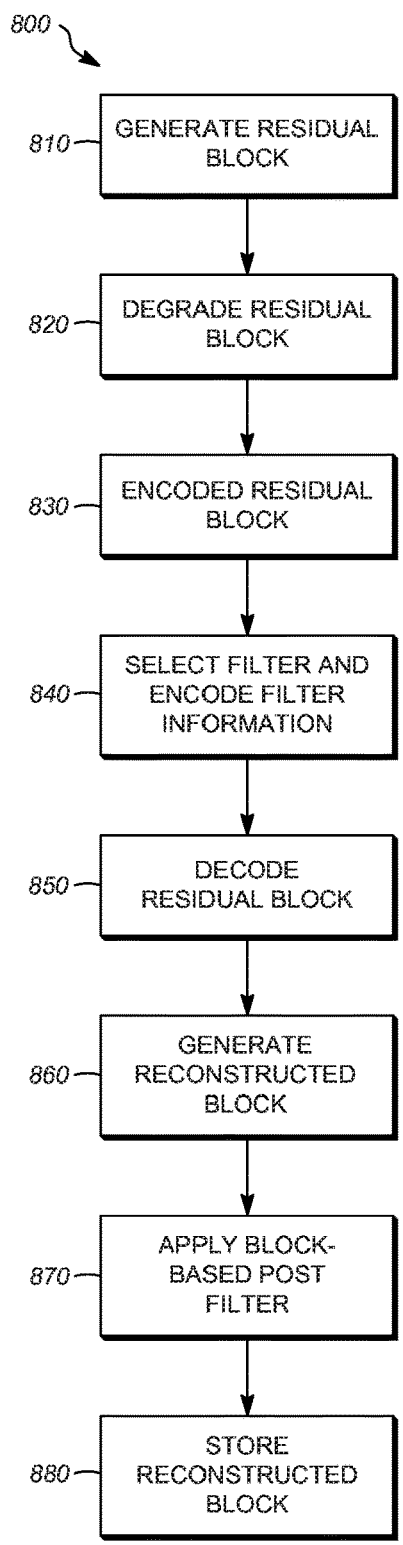
FIG. 8 is a flowchart showing an encoding process according to the first example.

FIG. 8 shows an example of an encoding process 800. The encoding process 800 can be implemented, for example, as a software program that is executed by computing devices such as the transmitting station 112 or the receiving station 130. The software program can include machine-readable instructions that are stored in a memory such as memory 226 that, when executed by a processor such as CPU 224, cause the computing device to perform the encoding process 800. The encoding process 800 can also be implemented using hardware. As explained above, some computing devices may have multiple memories and multiple processors, and the steps of the encoding process 800 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

Operation 810 includes generating the residual block 630 from the original block 610 and the prediction block 620. This can be performed in a conventional manner as previously described. This operation can further include obtaining the original block 610. The original block 610 can be obtained in any manner such as by receiving it in a video signal or accessing it from a storage device. This operation can also include identifying the prediction block 620 that will be used with the original block 610 to define the residual block 630. This can be performed using any of a number of well-known algorithms that search for matching reference blocks in the current frame or in other frames of the video signal. Thus, the prediction block 620 can be identified by comparing the contents of the original block 610 with the contents of a plurality of blocks from the video signal and choosing the best matching block as the prediction block 620.

Operation 820 includes degrading the residual block 630, which can be performed in the manner described with respect to the degraded residual block 640. Subsequent to degrading the degraded residual block 640, it is then encoded at operation 830.

Operation 840 includes selecting a block-based post filter that will be utilized to recover some of the high frequency information that was removed from the residual block 630 in order to reduce the bit cost for encoding it to define the degraded residual block 640. This information can be encoded with the encoded residual block 650, such as by placing it in the header of the encoded residual block 650.

Subsequent to encoding the encoded residual block 650 and the filter information, the remainder of the process 800 is directed to decoding and reconstruction of the encoded residual block such that it can be used as a prediction block in further encoding operations. In operation 850, the encoded residual block 650 is decoded. The result of operation 850 is the decoded residual block 660. At operation 860, the decoded residual block 660 is combined with the prediction block 620 that was previously utilized at operation 810 to generate the residual block 630. The result of this operation is the reconstructed block 670. In operation 870, the block-based post filter is applied to the reconstructed block 670 to recover some of the high frequency information that was previously discarded in the process of generating the degraded residual block 640 at operation 820. Subsequent to filtering, the filtered reconstructed block 680 is stored at operation 880 for subsequent use as the prediction block 620 in a subsequent encoding operation for a different block.

Figure 9:
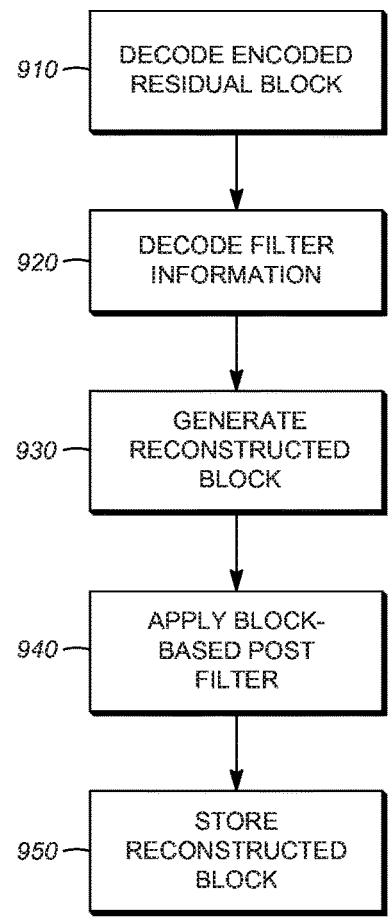
FIG. 9 is a flowchart showing a decoding process according to the first example.

FIG. 9 shows an example of a decoding process 900. The decoding process 900 can be implemented, for example, as a software program that is executed by computing devices such as the transmitting station 112 or the receiving station 130. The software program can include machine-readable instructions that are stored in a memory such as memory 226 that, when executed by a processor such as CPU 224, cause the computing device to perform the decoding process 900. The decoding process 900 can also be implemented using hardware. As explained above, some computing devices may have multiple memories and multiple processors, and the steps of the decoding process 900 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

Operation 910 includes decoding the encoded residual block 710 into the decoded residual block 720 as previously described. In operation 920, filter information is decoded from the video bit stream, such as from the header of the encoded residual block 710. In operation 930, the reconstructed block 740 is generated by adding the decoded residual block 720 to the prediction block 730. In operation 940, a block-based post filter is applied to the reconstructed block 740 to recover information lost during degradation. The filtered reconstructed block 750 can then be output for display and can also be stored at operation 950, as the prediction block 730 for use in a subsequent decoding operation.

Figure 10:
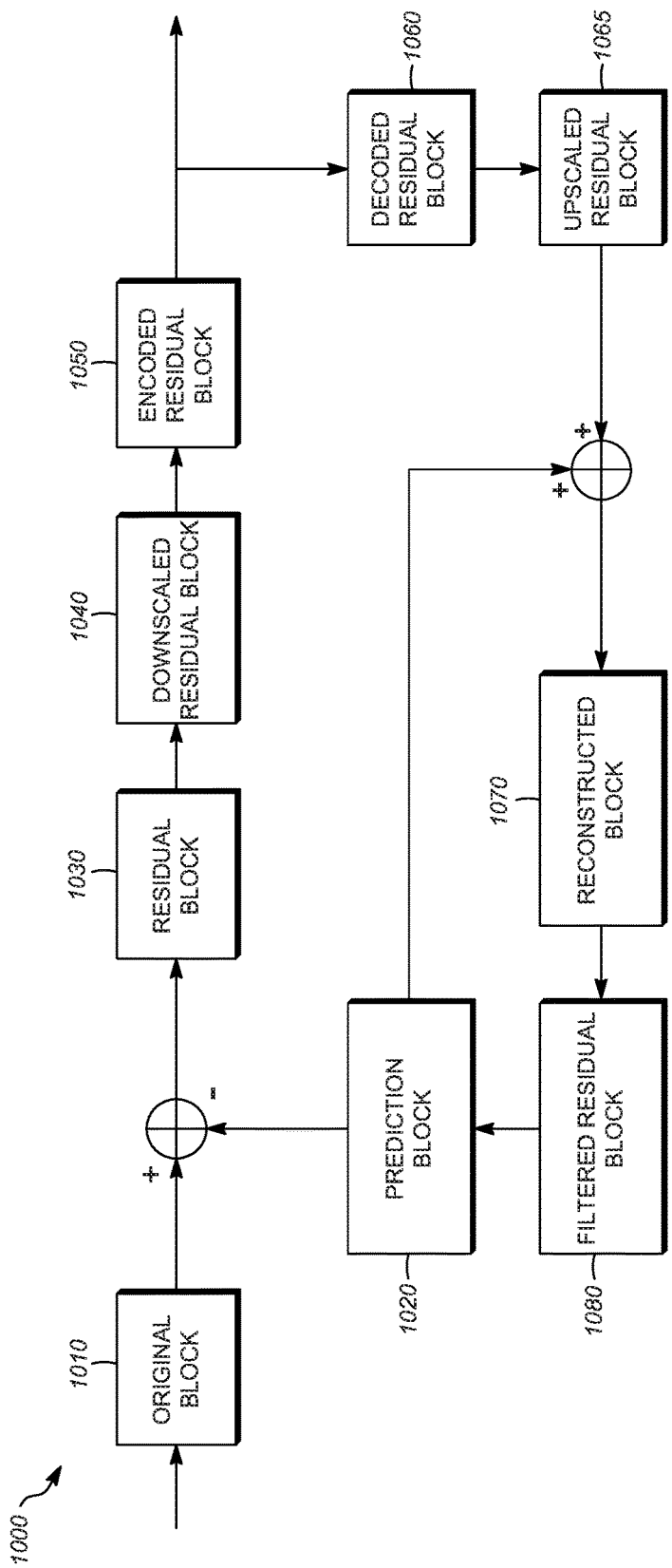
FIG. 10 is a block diagram showing encoding applied to an original block of a video signal according to a second example.

FIG. 10 is a block diagram showing video encoding 1000 that incorporates downscaling of residual blocks and block-based post filtering according to a first example, applied to an original block 1010 from a video signal having a plurality of frames, each frame having a plurality of blocks, and each block having a plurality of pixels. Video encoding 1000 can be implemented, for example, in the encoder 470, and the description of the encoder 470 is applicable except as described herein. The original block 1010 has a first resolution, which can be, but is not necessarily, a maximum resolution for the video signal.

A prediction block 1020 is identified for use in generating a residual block 1030. The resolutions of the prediction block 1020 can be the same as the resolution of the original block 1010. The prediction block 1020 can be a block from a different frame than the current frame if an inter-prediction mode is used, or can be a block from the current frame if an intra-prediction mode is used. The prediction block 1020 is selected in a conventional manner according to the prediction mode used, such that the prediction block 1020 has a high degree of correspondence to the original block 1010. In order to generate the residual block 1030, the prediction block 1020 is subtracted from the original block 1010, and the remaining information is utilized as the residual block 1030.

In order to reduce the bit cost for encoding the residual block 1030, the residual block 1030 is downscaled to generate a downscaled residual block 1040. Downscaling the residual block 1030 can be performed in any manner that reduces the resolution of the residual block 1030. As an example, one common method of downscaling takes the average of multiple adjacent pixel values and sets a corresponding value in the downscaled image to the average value. Suitable downscaling operations may reduce the resolution of the encoded residual block 1030 to a second resolution that is, as examples, half or one-quarter the first resolution at which the residual block 1030 was calculated. Any other suitable magnitude of downscaling can be utilized. In some implementations, the downscaling is performed in the context of a coding mode that applies a predetermined magnitude of downscaling to the residual block 1030 in order to generate the downscaled residual block 1040. In other implementations, the magnitude of the downscaling is selected based on the content of the video signal, the plurality of frames, the current frame, or the block. This selection can be made, for example, by comparing the rate-distortion performance of multiple alternatives.

The downscaled residual block 1040 is encoded to define an encoded residual block 1050. Encoding can be performed as described with respect to the encoder 470, including transform stage 474, quantization stage 476, and entropy encoding in stage 478. The encoded residual block 1050 can be stored or transmitted. In some implementations, filter information is stored or transmitted along with the encoded residual block 1050. The filter information can indicate whether a filter is to be applied to the during decoding, can include information such as an identifier that corresponds to a predefined filter to be used for filtering during decoding, and/or can include a plurality of filter parameters that can be utilized during decoding.

Subsequent to generation of the encoded residual block 1050, the information from the encoded residual block 1050 is recovered using a process analogous to that which will be applied at the decoder side in order to generate a prediction block that can be used for encoding of subsequent blocks in the current frame or a different frame. Thus, the encoded residual block 1050 is decoded to generate a decoded residual block 1060, such as in the manner described with respect to entropy decoding stage 502, de-quantization stage 504, and inverse transform stage 506 of the decoder 500. The decoded residual block 1060 is at the second resolution, which is the same resolution as the downscaled residual block 1050 prior to encoding. The decoded residual block 1060 is then upscaled to define an upscaled decoded residual block 1065. Upscaling can be performed by any one of numerous well known methods.

The upscaled decoded residual block 1065 is then added to the prediction block 1020 that was previously utilized to generate the residual block 1030 from the original block 1010. The result of adding the upscaled decoded residual block 1065 to the prediction block 1020 is a reconstructed block 1070.

In order to recover some of the high frequency information that was lost as a result of downscaling and subsequently upscaling the residual block 1030, a block-based post-filter is applied to the reconstructed block 1070. In some implementations, the filter is a block-based loop filter. The block-based loop filter that is utilized for filtering the reconstructed block 1070 can be designed in various ways. In one implementation, the block-based loop filter is a Weiner filter, which minimizes the mean square area between the reconstructed block 1070 and the original block 1010. For a given filter window size, the filter can be designed as a two-dimensional Weiner filter using linear estimation theory. The two-dimensional Weiner filter is then decomposed into two one-dimensional filters. The two-dimensional filter can be decomposed into two one-dimensional filters using decomposition techniques such as singular value decomposition and iterative optimization.

The block-based loop filters can be generated in advance of encoding or can be generated during the encoding process. Predefined filters can be defined in advance of encoding by training a plurality of filters using a variety of sample video input filters. The trained filters are then clustered, and the filter at the center of each cluster can be utilized to form a filter family. The filter family is then made available at both the end coder and the decoder. During encoding, a particular family can be selected. As one example, the filter can be selected by comparing the rate distortion performance for a plurality of the filters from the filter family as applied to at least a portion of the video signals being encoded. The selected filter can then be applied to other portions of the video signal. Selection of the filter can be made at any level of granularity. Thus, the same filter could be selected for a series of frames, a single frame, a macroblock, or the filter could be selected on a block-by-block basis. In another implementation, the filter to be used for filtering the reconstructed block 1070 is designed during encoding, with the result of filtered selection being a plurality of filter parameters that can be transmitted to the decoded for use in decoding the video bit stream.

As previously indicated, information identifying the filter selected for filtering the reconstructed block 1070 can be stored in association with the video bit stream. In one implementation, information identifying the filter to be utilized can be encoded within the block header for each block. In implementations where a predefined filter is used, information identifying the predefined filter is transmitted or stored with the video bit stream. In implementations where a filter is designed during encoding, the parameters describing the filter can be transmitted or stored with the video bit stream.

The result of filtering the reconstructed block 1070 utilizing the block-based post filter is the filtered reconstructed block 1080. The filtered reconstructed block can be stored at the encoder for use in subsequent prediction operations.

Figure 11:
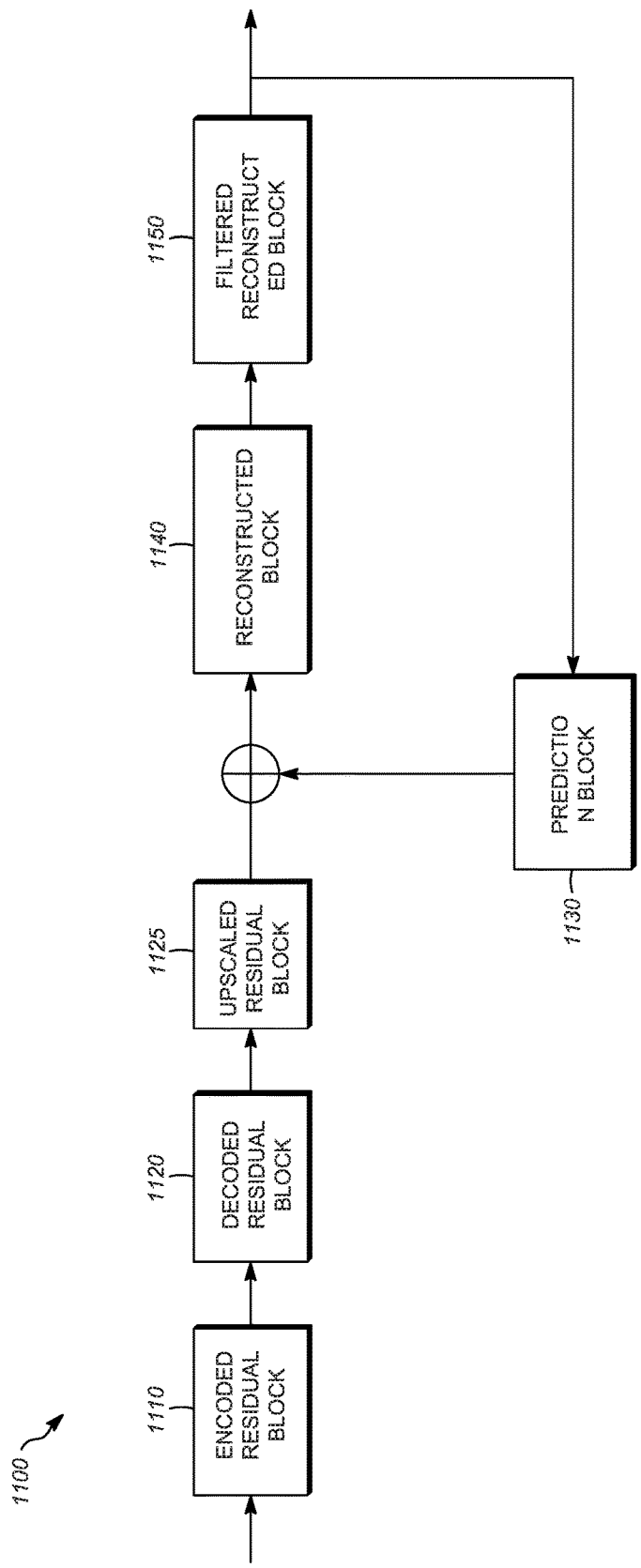
FIG. 11 is a block diagram showing decoding applied to an encoded block of a video bitstream according to the second example.

FIG. 11 is a block diagram showing video decoding 1100 that incorporates upscaling of residual blocks and block-based post filtering. Video decoding 1100 is applied to an encoded residual block 1110 from a video bit stream having a plurality of frames, each frame having a plurality of blocks, and each block having a plurality of pixels. The encoded residual block 1110 can be generated in the manner described with respect to video encoding 1000.

The encoded residual block 1110 is decoded into a decoded residual block 1120. Decoding of the encoded residual block 1120. Decoding of the encoded residual block 1110 can be performed in the manner described with respect to the entropy decoding stage 502, the dequantization stage 504, and the inverse transform stage 506 of the decoder 500. The encoded residual block 1110 is upscaled in order to generate an upscaled decoded residual block 1125. The decoded residual block 1110 has a first resolution and the upscaled decoded residual block 1125 has a second resolution that is greater than the first resolution. As examples, the second resolution can be double or quadruple the first resolution.

The upscaled decoded residual block 1125 is combined with a prediction block 1130 by adding the upscaled decoded residual block 1125 to the prediction block 1130. The result is a reconstructed block 1140. The reconstructed block 1140 is of reduced quality relative to the original block 1010 owing to loss of information in from the residual block 1030 as a result of downscaling during video encoding 1000 and upscaling the residual generating during video decoding 1100. In order to restore some of the high frequency information that was lost during downscaling, a block-based filter is applied to the reconstructed block 1140, which results in a filtered reconstructed block 1150. The filter applied to generate the filtered reconstructed block 1150 can be identified from information in the video bit stream, such as filter information regarding the block-based post filter to be utilized in filtering the reconstructed block 1140. As previously discussed, the filter information can be received from the video bit stream, such as by decoding the filter information from the header of the encoded residual block 1110. The filter information can include, for example, an identifier that corresponds to a predefined filter or a plurality of filter parameters that define the filter.

The filtered reconstructed block 1150 can be output as a video signal. For example, the filtered reconstructed block 1150 could be output for display. The filtered reconstructed block is also stored for use in decoding of other blocks by storing the filtered reconstructed block 1150 as the prediction block 1130.

FIG. 12 shows an example of an encoding process 1200. The encoding process 1200 can be implemented, for example, as a software program that is executed by computing devices such as the transmitting station 112 or the receiving station 130. The software program can include machine-readable instructions that are stored in a memory such as memory 226 that, when executed by a processor such as CPU 224, cause the computing device to perform the encoding process 1200. The encoding process 1200 can also be implemented using hardware. As explained above, some computing devices may have multiple memories and multiple processors, and the steps of the encoding process 1200 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

Operation 1210 includes generating the residual block 1030 from the original block 1010 and the prediction block 1020. This can be performed in a conventional manner as previously described. This operation can further include obtaining the original block 1010. The original block 1010 can be obtained in any manner such as by receiving it in a video signal or accessing it from a storage device. This operation can also include identifying the prediction block 1020 that will be used with the original block 1010 to define the residual block 1030. This can be performed using any of a number of well-known algorithms that search for matching reference blocks in the current frame or in other frames of the video signal. Thus, the prediction block 1020 can be identified by comparing the contents of the original block 1010 with the contents of a plurality of blocks from the video signal and choosing the best matching block as the prediction block 1020.

Operation 1220 includes downscaling the residual block 1030, which can be performed in the manner described with respect to the downscaled residual block 1040. The downscaled residual block 1040 is then encoded at operation 1230.

Operation 1240 includes selecting a block-based post filter that will be utilized to recover some of the high frequency information that was removed from the residual block 1030 in order to reduce the bit cost for encoding it to define the downscaled residual block 1040. This information can be encoded with the encoded residual block 1050, such as by placing it in the header of the encoded residual block 1050.

Subsequent to encoding the encoded residual block 1050 and the filter information, the remainder of the process 1200 is directed to decoding and reconstruction of the encoded residual block such that it can be used as a prediction block in further encoding operations. In operation 1250, the encoded residual block 1050 is decoded. The result of operation 1250 is the decoded residual block 1060. At operation 1255, the decoded residual block 1060 is upscaled, which results in generation of the upscaled decoded residual block 1065 At operation 1260, the upscaled decoded residual block 1065 is combined with the prediction block 1020 that was previously utilized at operation 1210 to generate the residual block 1030. The result of this operation is the reconstructed block 1070. In operation 1270, the block-based post filter is applied to the reconstructed block 1070 to recover some of the high frequency information that was previously discarded in the process of generating the downscaled residual block 1040 at operation 1220. Subsequent to filtering, the filtered reconstructed block 1080 is stored at operation 1280 for subsequent use as the prediction block 1020 in a subsequent encoding operation for a different block.

FIG. 13 shows an example of a decoding process 1300. The decoding process 1300 can be implemented, for example, as a software program that is executed by computing devices such as the transmitting station 112 or the receiving station 130. The software program can include machine-readable instructions that are stored in a memory such as memory 226 that, when executed by a processor such as CPU 224, cause the computing device to perform the decoding process 1300. The decoding process 1300 can also be implemented using hardware. As explained above, some computing devices may have multiple memories and multiple processors, and the steps of the decoding process 1300 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

Operation 1310 includes decoding the encoded residual block 1110 into the decoded residual block 1120 as previously described. In operation 1320, filter information is decoded from the video bit stream, such as from the header of the encoded residual block 1110. In operation 1325, the decoded residual block in upscaled, which results in the upscaled decoded residual block 1125.

In operation 1330, the reconstructed block 1140 is generated by adding the upscaled decoded residual block 1125 to the prediction block 1130. In operation 1340, a block-based post filter is applied to the reconstructed block 1140 to recover information lost as a result of downscaling and subsequent upscaling. The filtered reconstructed block 1150 can then be output for display and can also be stored at operation 1350, as the prediction block 1130 for use in a subsequent decoding operation.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computing devices of any type. For instance, the transmitting station 112 can be a personal computer that includes a video capture device for obtain raw video to be encoded and the receiving station 130 can be a personal computer that includes a video display device for displaying decoded video. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. As one example, receiving station 130 can be a generally stationary personal computer rather than a portable communications device. As another example, a device that includes the encoder 470 may also include the decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal using a computing device, the video signal having a plurality of frames, each frame having a plurality of blocks, and each block having a plurality of pixels, the method comprising:
   generating, by a prediction stage of an encoder, a residual block from an original block of a current frame and a prediction block, the encoder includes the prediction stage, a transform stage for generating a transform block of transform coefficients for the residual block to a transform domain, and a quantization stage for quantizing the transform coefficients;
   degrading the residual block, to decrease a bit-cost for encoding the residual block, by steps of the encoder that are different than steps performed by the transform stage and the quantization stage, wherein degrading the residual block includes removing high frequency information from the residual block;
   selecting a block-based post filter for recovering at least some of the high frequency information removed from the residual block during the degrading;
   encoding the degraded residual block into an encoded residual block; and
   encoding data indicative of the block-based post filter to a header of the encoded residual block.

2. The method of claim 1, wherein degrading the residual block comprises:
   downscaling the residual block to generate a downscaled residual block of pixel values.

3. The method of claim 1 wherein the data indicative of the block-based filter includes an identifier that corresponds to a predefined filter.

4. The method of claim 1, wherein the data indicative of the block-based filter includes a plurality of filter parameters.

5. The method of claim 1, further comprising:
   decoding the encoded residual block into a decoded residual block;
   generating a reconstructed block from decoded residual block and the prediction block;
   applying the block-based post filter to the reconstructed block; and
   storing the filtered reconstructed block for use in a subsequent prediction operation.

6. The method of claim 5, wherein degrading the residual block includes downscaling the residual block to generate a downscaled residual block of pixel values, and wherein encoding the residual block into the encoded residual block includes encoding the downscaled residual block into the encoded residual block, the method further comprising:
   upscaling the decoded residual block prior to generating the reconstructed block.

7. A method for decoding a video bitstream using a computing device, the video bitstream having a plurality of frames, each frame having a plurality of blocks, and each block having a plurality of pixels, the method comprising:
   decoding an encoded residual block from the video bitstream into a decoded residual block, wherein the decoded residual block is a block of first pixel values downgraded during encoding to remove high frequency information;
   upscaling the decoded residual block prior to generate an upscaled decoded residual block, wherein the upscaled decoded residual block is a block of second pixel values;
   generating a reconstructed block from a prediction block and the upscaled decoded residual block; and
   applying a block-based post filter to the reconstructed block to restore at least some of the high frequency information to the reconstructed block.

8. The method of claim 7, wherein upscaling the decoded residual block upscales the decoded residual block from a first resolution to a second resolution that is greater than the first resolution and is equal to a resolution of the prediction block.

9. The method of claim 7, further comprising:
   decoding filter information regarding the block-based post filter for the decoded residual block.

10. The method of claim 9, wherein the filter information includes an identifier that corresponds to a predefined filter for use as the block-based post filter.

11. The method of claim 9, wherein the filter information includes a plurality of filter parameters that define the block-based post filter.

12. An apparatus for encoding a video signal using a computing device, the video signal having a plurality of frames, each frame having a plurality of blocks, and each block having a plurality of pixels, the apparatus comprising:
   a memory; and
   a processor configured to execute instructions stored in the memory to:
      generate, by a prediction stage of an encoder, a residual block from an original block of a current frame and a prediction block, the encoder includes the prediction stage, a transform stage for generating a transform block of transform coefficients for the residual block to a transform domain, and a quantization stage for quantizing the transform coefficients;
      degrade the residual block, to decrease a bit-cost for encoding the residual block, by steps of the encoder that are different than steps performed by the transform stage and the quantization stage, wherein degrading the residual block includes removing high frequency information from the residual block;
      select a block-based post filter for recovering at least some of the high frequency information removed from the residual block during the degrading;
      encode the degraded residual block into an encoded residual block; and
      encode data indicative of the block-based post filter to a header of the encoded residual block.

13. The apparatus of claim 12, wherein the processor is further configured to execute instructions stored in the memory to:
- decode the encoded residual block into a decoded residual block,
- generate a reconstructed block from decoded residual block and the prediction block,
- apply the block-based post filter to the reconstructed block, and
- store the filtered reconstructed block for use in a subsequent prediction operation.

14. An apparatus for decoding a video bitstream using a computing device, the video bitstream having a plurality of frames, each frame having a plurality of blocks, and each block having a plurality of pixels, the apparatus comprising:
- a memory; and
- a processor configured to execute instructions stored in the memory to:
    - decode an encoded residual block from the video bitstream into a decoded residual block, wherein the decoded residual block is a block of first pixel values downgraded during encoding to remove high frequency information;
    - upscale the decoded residual block to generate an upscaled decoded residual block, wherein the upscaled decoded residual block is a block of second pixel values;
    - generate a reconstructed block from a prediction block and the upscaled decoded residual block; and
    - apply a block-based post filter to the reconstructed block to restore at least some of the high frequency information to the reconstructed block.

15. The apparatus of claim 14, wherein to upscale the decoded residual block comprises to:
- upscales the decoded residual block from a first resolution to a second resolution that is greater than the first resolution and is equal to a resolution of the prediction block.

16. The apparatus of claim 14, wherein the processor is further configured to execute instructions stored in the memory to:
- decode filter information from the video bitstream regarding the block-based post filter for the decoded residual block.

* * * * *